(12) United States Patent
Graves et al.

(10) Patent No.: US 12,388,853 B2
(45) Date of Patent: Aug. 12, 2025

(54) SYSTEM AND METHOD FOR MACHINE LEARNING BASED MALWARE DETECTION

(71) Applicant: BlackBerry Limited, Waterloo (CA)

(72) Inventors: Laura Micah Graves, Waterloo (CA); Anandadip Mandal, Noida (IN)

(73) Assignee: BlackBerry Limited, Waterloo (CA)

( * ) Notice: Subject to any disclaimer, the term of this patent is extended or adjusted under 35 U.S.C. 154(b) by 443 days.

(21) Appl. No.: 17/737,446

(22) Filed: May 5, 2022

(65) Prior Publication Data

US 2023/0362177 A1 Nov. 9, 2023

(51) Int. Cl.
*H04L 9/40* (2022.01)
*G06F 21/55* (2013.01)
*H04L 43/02* (2022.01)
*G06F 21/56* (2013.01)
*H04L 43/026* (2022.01)
*H04L 43/04* (2022.01)

(52) U.S. Cl.
CPC ........ *H04L 63/1425* (2013.01); *H04L 63/101* (2013.01); *H04L 63/145* (2013.01)

(58) Field of Classification Search
CPC . H04L 63/1425; H04L 63/101; H04L 63/145; G06F 21/56
See application file for complete search history.

(56) References Cited

U.S. PATENT DOCUMENTS

| | | | | |
|---|---|---|---|---|
| 11,086,988 B1 * | 8/2021 | Putman | ................ | G06F 21/577 |
| 11,399,039 B2 * | 7/2022 | Rubin | ................ | G06F 21/554 |
| 11,461,590 B2 * | 10/2022 | Marwah | ................ | G06F 17/16 |
| 11,558,424 B2 * | 1/2023 | Anderson | ................ | G06F 18/23 |
| 11,575,695 B2 * | 2/2023 | Liu | ................ | H04L 63/1416 |
| 11,615,192 B2 * | 3/2023 | Brannon | ................ | G06F 21/6245 |
| | | | | 726/25 |
| 11,616,761 B2 * | 3/2023 | Lam | ................ | H04L 63/0263 |
| | | | | 726/11 |
| 11,695,656 B2 * | 7/2023 | Han | ................ | H04W 24/02 |
| | | | | 709/224 |
| 11,705,226 B2 * | 7/2023 | Colley | ................ | G16H 50/70 |
| | | | | 705/3 |
| 11,855,864 B2 * | 12/2023 | Han | ................ | H04L 43/062 |
| 11,936,690 B2 * | 3/2024 | Anderson | ................ | H04L 63/306 |
| 12,003,485 B2 * | 6/2024 | Lam | ................ | H04L 63/0263 |
| 12,120,128 B1 * | 10/2024 | Iqbal | ................ | G06N 20/00 |
| 2010/0169158 A1 * | 7/2010 | Agarwal | ................ | G06N 5/02 |
| | | | | 705/7.11 |

(Continued)

OTHER PUBLICATIONS

Abraham et al.:"A Comparison of Machine Learning Approaches to Detect Botnet Traffic", 2018 International Joint Conference on Neural Networks(IJCNN), IEEE, pp. 1-8, XP033418905, Jul. 8, 2018 (listed in IDS filed on Sep. 29, 2023) (Year: 2018).*

(Continued)

*Primary Examiner* — Venkat Perungavoor
(74) *Attorney, Agent, or Firm* — Conley Rose, P.C.; J. Robert Brown, Jr.

(57) ABSTRACT

A method comprises obtaining a training set of network data that includes benign network data and malware network data; engaging a feature extraction engine to generate a set of dyads for each source-destination pair in the training set of network data; and training, using the set of dyads, a machine learning engine to differentiate between the benign network data and the malware network data.

18 Claims, 7 Drawing Sheets

(56) References Cited

U.S. PATENT DOCUMENTS

| | | | | |
|---|---|---|---|---|
| 2019/0098039 | A1* | 3/2019 | Gates | G16H 20/70 |
| 2020/0351279 | A1* | 11/2020 | Dennison | G06F 21/552 |
| 2021/0103654 | A1* | 4/2021 | Putman | G06F 21/56 |
| 2021/0194909 | A1* | 6/2021 | Tang | H04L 63/1408 |
| 2023/0084333 | A1* | 3/2023 | Clinchant | G06N 3/09 |
| | | | | 704/2 |
| 2023/0092522 | A1* | 3/2023 | Li | H04L 63/1416 |
| | | | | 726/22 |
| 2023/0216872 | A1* | 7/2023 | Ikeda | H04L 41/16 |
| | | | | 726/23 |
| 2023/0245534 | A1* | 8/2023 | Jayabalan | G06Q 20/1085 |
| 2023/0281327 | A1* | 9/2023 | Crockett | G06F 21/606 |
| | | | | 726/26 |
| 2023/0282316 | A1* | 9/2023 | Malvar Maua | G16C 20/80 |
| | | | | 706/12 |
| 2023/0351178 | A1* | 11/2023 | Ciftci | G06V 40/45 |
| 2023/0362173 | A1* | 11/2023 | Dalton | H04W 12/121 |
| 2024/0020491 | A1* | 1/2024 | Chen | G06N 3/045 |

OTHER PUBLICATIONS

Piskozub et al.: "MalAlert", ACM Sigmetrics per Formance Evaluation Review, Association for Computing Machinery, New York, NY, US, vol. 46, No. 3, pp. 151-154, XP058426273, Jan. 25, 2019 (listed in IDS filed on Sep. 29, 2023) (Year: 2019).*

Abraham et al.: "A Comparison of Machine Learning Approaches to Detect Botnet Traffic", 2018 International Joint Conference on Neural Networks (IJCNN), IEEE, pp. 1-8, XP033418905, Jul. 8, 2018.

Piskozub et al.: "MalAlert", ACM Sigmetrics Performance Evaluation Review, Association for Computing Machinery, New York, NY, US, vol. 46, No. 3, pp. 151-154, XP058426273, Jan. 25, 2019.

EPO: Extended European Search Report relating to EP applicationn No. 23170295.2, dated Sep. 29, 2023.

* cited by examiner

SYSTEM AND METHOD FOR MACHINE LEARNING BASED MALWARE DETECTION

TECHNICAL FIELD

The present disclosure relates to machine learning and in particular to a system and method for machine learning based malware detection.

BACKGROUND

Command and control is a post-exploitation tactic that allows attackers to maintain persistence, communicate with infected hosts, exfiltrate data and issue commands. Once a host is infected, malware establishes a command and control channel to the attacker. To avoid detection, agents often lie dormant for long periods, periodically communicating with the server for further instructions. These intermittent communications are referred to as malware beacons.

Detecting the presence of malware beacons in network data is difficult for a number of reasons. For example, the check-in interval for implanted agents varies and most command and control systems have built-in techniques to avoid detection such as for example by adding random jitter to the callback time. As another example, malware beacons are often disguised as network data by imitating normal communications such as DNS or HTTP requests.

BRIEF DESCRIPTION OF THE DRAWINGS

Reference will now be made, by way of example, to the accompanying drawings which show example embodiments of the present application and in which.

Like reference numerals are used in the drawings to denote like elements and features.

DETAILED DESCRIPTION OF EXAMPLE EMBODIMENTS

Figure 1:
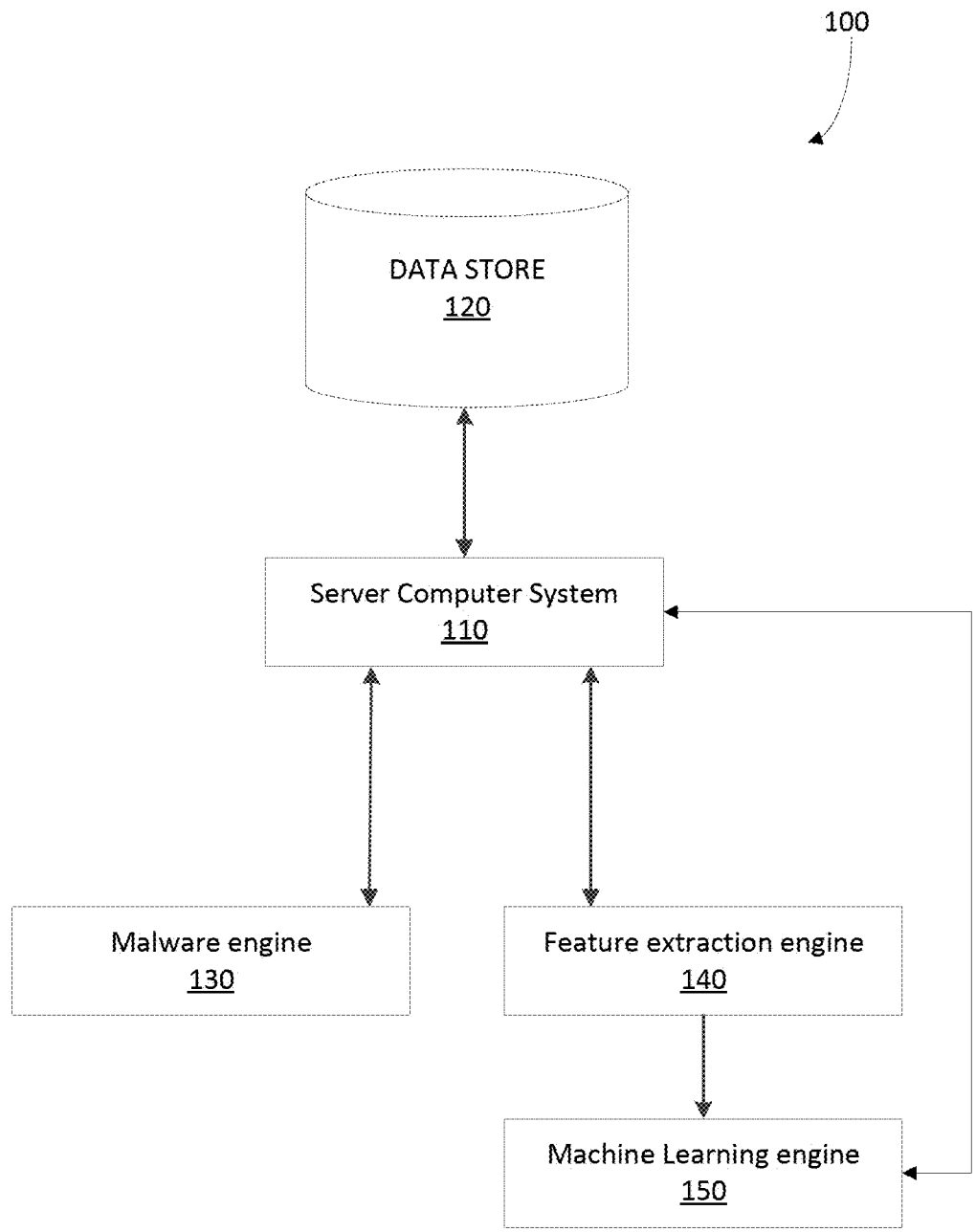
FIG. 1 shows a high-level block diagram of system for machine learning based malware detection according to an embodiment.

Accordingly, in an aspect there is provided a method comprising obtaining a training set of network data that includes benign network data and malware network data; engaging a feature extraction engine to generate a set of dyads for each source-destination pair in the training set of network data; and training, using the set of dyads, a machine learning engine to differentiate between the benign network data and the malware network data.

In one or more embodiments, the method further comprises obtaining network data identifying at least one new event for at least one source-destination pair; engaging the feature extraction engine to generate a set of dyads for the at least one source-destination pair associated with the at least one new event; and sending the set of dyads for the at least one source-destination pair associated with the at least one new event to the machine learning engine for classification.

In one or more embodiments, the method further comprises receiving, from the machine learning engine, data classifying the at least one source-destination pair as one of benign or malware.

In one or more embodiments, the method further comprises receiving, from the machine learning engine, data classifying the at least one source-destination pair as malware; and adding an internet protocol address of at least one of the source or the destination to a blacklist.

In one or more embodiments, the method further comprises generating, using a training malware server, the malware network data such that the malware network data includes an internet protocol address known to be associated with the training malware server.

In one or more embodiments, the malware network data is generated to mimic malware beacons by varying at least one of a communication interval, a jitter amount, or a data channel.

In one or more embodiments, the set of dyads for each source-destination pair includes communication interval skew and communication interval kurtosis.

In one or more embodiments, the malware network data includes a communication interval skew that is more consistent than the benign network data.

In one or more embodiments, the malware network data includes a communication interval kurtosis that is more evenly clustered than the benign network data.

In one or more embodiments, the set of dyads includes a number of flow events, a mean of bytes down, a standard deviation of bytes down, a mean of bytes up, a standard deviation of bytes up, a communication interval mean, a communication interval standard deviation, a communication interval skew, a communication interval kurtosis, a number of local end points that made a connection to the destination and a number of remote end points that the local endpoint connected to.

According to another aspect there is provided a system comprising at least one processor; and a memory coupled to the at least one processor and storing instructions that, when executed by the at least one processor, configure the at least one processor to obtain a training set of network data that includes benign network data and malware network data; engage a feature extraction engine to generate a set of dyads for each source-destination pair in the training set of network data; and train, using the set of dyads, a machine learning engine to differentiate between the benign network data and the malware network data.

In one or more embodiments, the instructions, when executed by the at least one processor, further configure the at least one processor to obtain network data identifying at least one new event for at least one source-destination pair; engage the feature extraction engine to generate a set of dyads for the at least one source-destination pair associated with the at least one new event; and send the set of dyads for the at least one source-destination pair associated with the at least one new event to the machine learning engine for classification.

In one or more embodiments, the instructions, when executed by the at least one processor, further configure the at least one processor to receive, from the machine learning engine, data classifying the at least one source-destination pair as one of benign or malware.

In one or more embodiments, the instructions, when executed by the at least one processor, further configure the at least one processor to receive, from the machine learning engine, data classifying the at least one source-destination pair as malware; and add an internet protocol address of at least one of the source or the destination to a blacklist.

In one or more embodiments, the instructions, when executed by the at least one processor, further configure the at least one processor to generate, using a training malware server, the malware network data such that the malware network data includes an internet protocol address known to be associated with the training malware server.

In one or more embodiments, the malware network data is generated to mimic malware beacons by varying at least one of a communication interval, a jitter amount, or a data channel.

In one or more embodiments, the set of dyads for each source-destination pair includes communication interval skew and communication interval kurtosis.

In one or more embodiments, the malware network data includes at least one of a communication interval skew that is more consistent than the benign network data or a communication interval kurtosis that is more evenly clustered than the benign network data.

In one or more embodiments, the set of dyads includes a number of flow events, a mean of bytes down, a standard deviation of bytes down, a mean of bytes up, a standard deviation of bytes up, a communication interval mean, a communication interval standard deviation, a communication interval skew, a communication interval kurtosis, a number of local end points that made a connection to the destination and a number of remote end points that the local endpoint connected to.

According to another aspect there is provided a non-transitory computer readable medium having stored thereon processor-executable instructions that, when executed by the processor, cause the processor to obtain a training set of network data that includes benign network data and malware network data; engage a feature extraction engine to generate a set of dyads for each source-destination pair in the training set of network data; and train, using the set of dyads, a machine learning engine to differentiate between the benign network data and the malware network data.

Other example embodiments of the present disclosure will be apparent to those of ordinary skill in the art from a review of the following detailed description in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

FIG. 1 is a high-level block diagram of a system 100 for machine learning based malware detection according to an embodiment. The system 100 includes a server computer system 110 and a data store 120.

The data store 120 may include various data records. At least some of the data records may include network data. The network data may include a training set of network data that includes benign network data and malware network data. As will be described, the benign network data may include network data known to be benign, that is, known to not include malware. The malware network data may include network data that is known to be malware. Each network log may be referred to as a flow event.

In one or more embodiments, the network data stored in the data store 120 may include network logs where each network log is a flow event between a specific destination and a specific remote endpoint. Each network log may include a timestamp, a source internet protocol (IP) address, a destination IP address, a source port, a destination port, etc. The network log may additionally include data transmission information such as for example packet sizes, bytes up/down, etc.

The data store 120 may additionally maintain one or more whitelists that include IP addresses known to be trusted and may maintain one or more blacklists that include IP addresses known to be malware. As will be described, the one or more whitelists may be consulted such that any flow events associated with a whitelisted IP address may not be subject to classification. Similarly, the one or more blacklists may be consulted such that any flow events associated with a blacklisted IP address may be blocked or may cause an alert to be raised.

The data store 120 may only store network data that has occurred within a threshold time period. For example, the data store 120 may only store network data for the last seven (7) days and as such may drop, erase or otherwise delete network data that is more than seven (7) days old.

In one or more embodiments, the system 100 includes a malware engine 130, a feature extraction engine 140, and a machine learning engine 150. The malware engine 130 and the feature extraction engine 140 are in communication with the server computer system 110. The malware engine 130 may log network data locally and may export the logged network data to the data store 120 via the server computer system 110. The machine learning engine 150 is in communication with the feature extraction engine 140 and the server computer system 110. The malware engine 130, the feature extraction engine 140 and the machine learning engine 150 may be discrete computing devices in different environments.

The malware engine 130 may be configured to generate malware network data that may be used to train the machine learning engine 150. The malware network data may include malware beacons communicated between a source and destination pair. In one or more embodiments, the malware engine may include a virtual server such as a training malware server and one or more virtual computing devices and communication between the virtual server and the one or more virtual computing devices may be logged as malware network data.

The malware engine 130 may be configured to generate the malware network data by, for example, varying the beacon interval, jitter amount, data channels, etc. and in this manner a wide range of beacon obfuscation is obtained. The malware network data may include an IP address of the training malware server and this may be used to train the machine learning engine 150. For example, any network logs that include the IP address of the training malware server may be identified as malware network data.

As will be described, the malware network data generated by the malware engine 130 may be stored in the data store 120 and used to train the machine learning engine 150.

The feature extraction engine 140 is configured to analyze network data received from the data store 120 to generate a set of dyads for each source-destination pair in the network data. To generate the set of dyads for each source-destination pair in the network data, the feature extraction engine 140 may analyze the network data to categorize the network data by source-destination pair. For each source-destination pair, the set of dyads may include a number of flow events, a mean of bytes down, a standard deviation of bytes down, a mean of bytes up, a standard deviation of bytes up, a communication interval mean, a communication interval standard deviation, a communication interval skew, a communication interval kurtosis, a number of local end points that made a connection to the destination and a number of remote end points that the local endpoint connected to.

The number of flow events may include a count of how many flow events occur in the network data for the source-destination pair. Since each network log is a flow event, the feature extraction engine 140 may count the number of network logs for the source-destination pair in the network data and this may determine the number of flow events per source-destination pair.

The mean of bytes down for each source-destination pair may be generated by calculating an average size of bytes down for the source-destination pair for all flow events in the network data for the source-destination pair.

The standard deviation of byes down for each source-destination pair may be generated by calculating a standard deviation of bytes down for the source-destination pair for all flow events in the network data for the source-destination pair.

The mean of bytes up for each source-destination pair may be generated by calculating an average size of bytes up for the source-destination pair for all flow events in the network data for the source-destination pair.

The standard deviation of byes up for each source-destination pair may be generated by calculating a standard deviation of bytes up for the source-destination pair for all flow events in the network data for the source-destination pair.

The communication interval mean may include a mean of seconds between flow events and may be generated by calculating an average of seconds between flow events. It will be appreciated that seconds between flow events may be an amount of time between adjacent flow events.

The communication interval standard deviation may include a standard deviation of seconds between flow events and may be generated by calculating a standard deviation of seconds between flow events.

The communication interval skew may include a metric indicating how skewed toward one end a distribution is.

The communication interval kurtosis may include a metric indicating a tailedness of a probability distribution. The communication interval kurtosis may be generated by determining a measure of the combined weight of the distribution's tail relative to the center of the distribution.

The number of local end points that made a connection to the destination may include a count of local end points that had a flow event with the destination in the network data.

The number of remote end points that the local endpoint connected to may include a count of remote end points that had one or more flow events with the source in the network data.

The machine learning engine 150 may include or utilize one or more machine learning models. For example, the machine learning engine 150 may be a classifier such as for example a Random Forest classifier that may be trained to classify network data as one of malware network data of benign network data. Other machine learning methods that may be used include Support Vector Machines, decision-tree based boosting methods such as for example AdaBoost™ and XGBoost™.

In one or more embodiments, the set of dyads generated by the feature extraction engine using the training network data may be used to train the machine learning engine 150 for malware detection.

Figure 2:
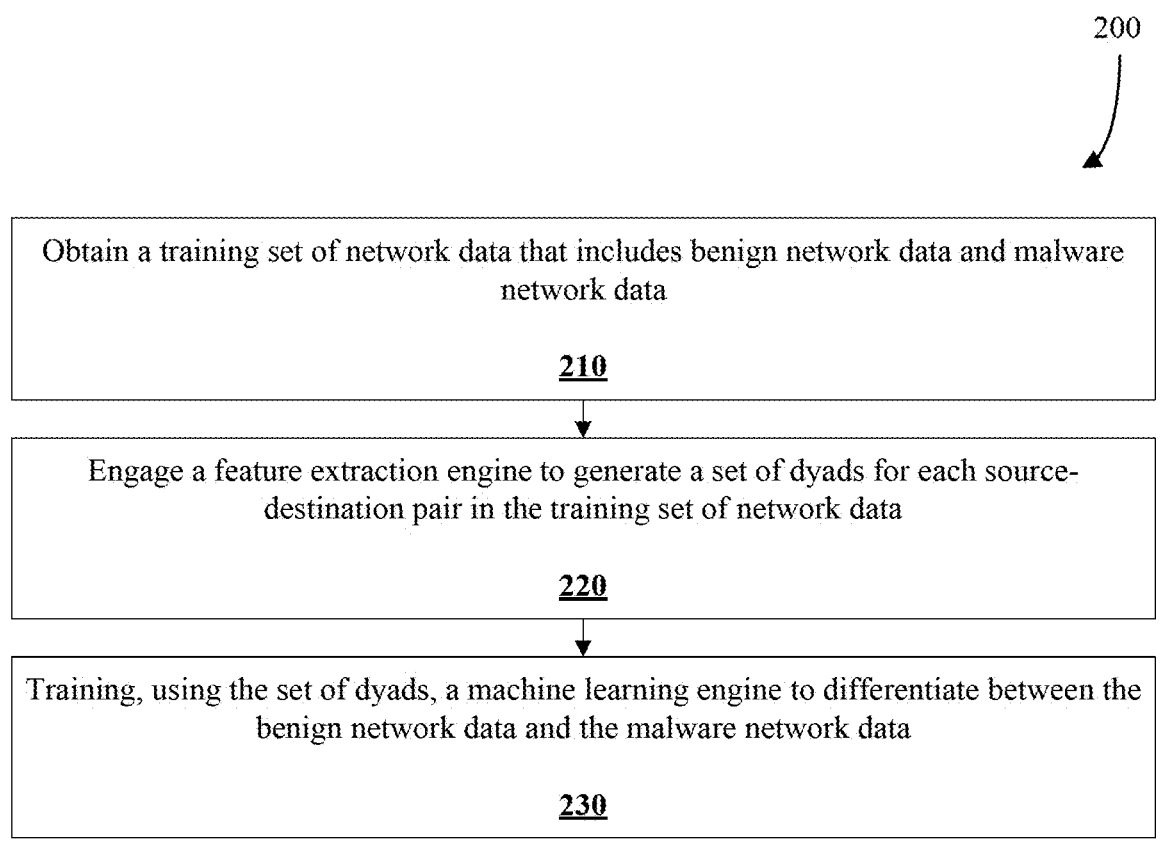
FIG. 2 provides a flow chart illustrating a method for training a machine learning engine for malware detection according to an embodiment.

FIG. 2 is a flowchart showing operations performed by the server computer system 110 for training the machine learning engine for malware detection according to an embodiment. The operations may be included in a method 200 which may be performed by the server computer system 110. For example, computer-executable instructions stored in memory of the server computer system 110 may, when executed by the processor of the server computer system, configure the server computer system 110 to perform the method 200 or a portion thereof. It will be appreciated that the server computer system 110 may offload at least some of the operations to the malware engine 130, the feature extraction engine 140 and/or the machine learning engine 150.

The method 200 includes obtaining a training set of network data that includes benign network data and malware network data (step 210).

In one or more embodiments, the server computer system 110 may obtain the training set of network data from the data store 120. As mentioned, the malware network data may be generated by the malware engine 130. The benign network data includes network data that is known to be benign and the malware network data includes network data that is known to be malware.

Figure 3A:
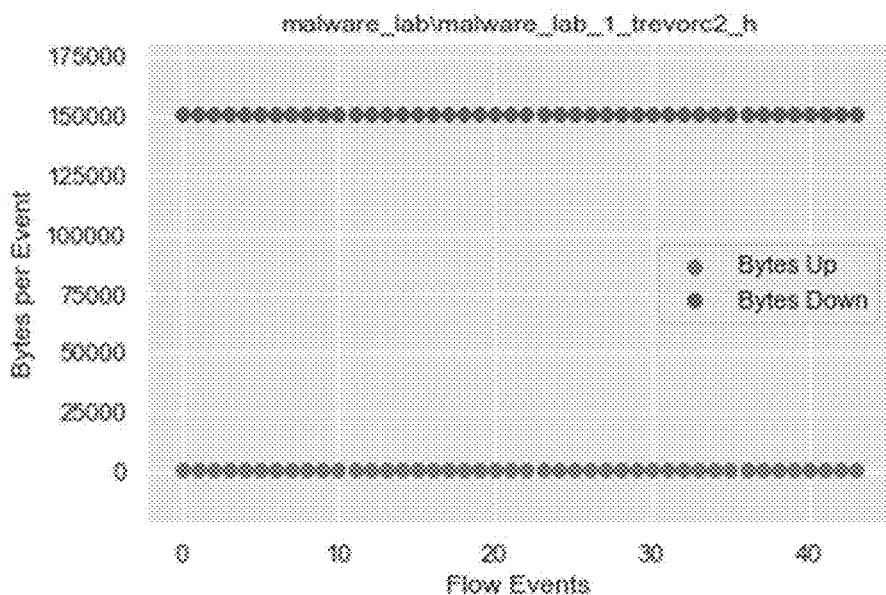
FIG. 3A is a graph showing data transmissions in malware network data used for training the machine learning engine according to the method of FIG. 2.

FIG. 3A is a graph showing data transmissions in malware network data used for training the machine learning engine.

Figure 3B:
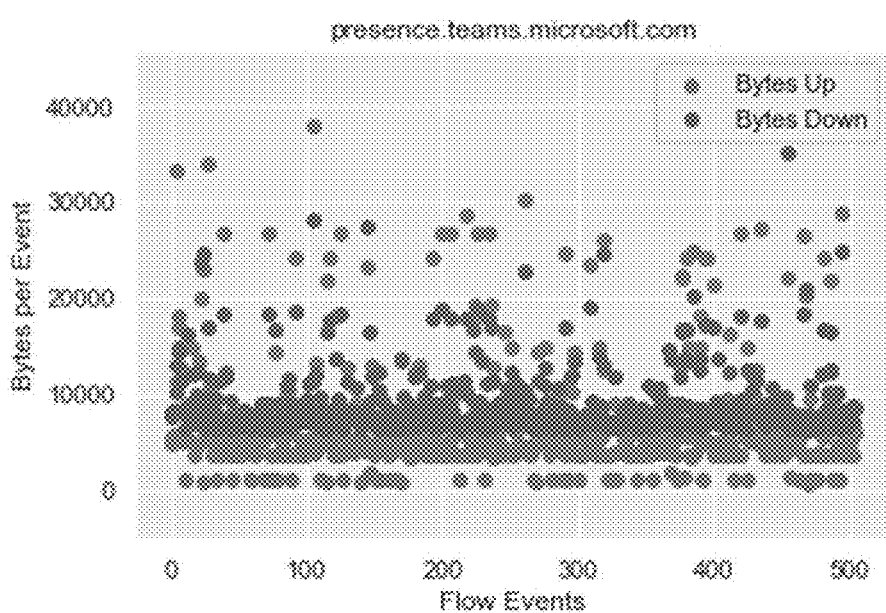
FIG. 3B is a graph showing data transmissions in benign network data used for training the machine learning engine according to the method of FIG. 2.

FIG. 3B is a graph showing data transmissions in benign network data used for training the machine learning engine.

Comparing FIG. 3A to FIG. 3B, it can be seen that the malware network data includes packet sizes that are very consistent and the benign network data has inconsistent data patterns and packet sizes.

Figure 4A:
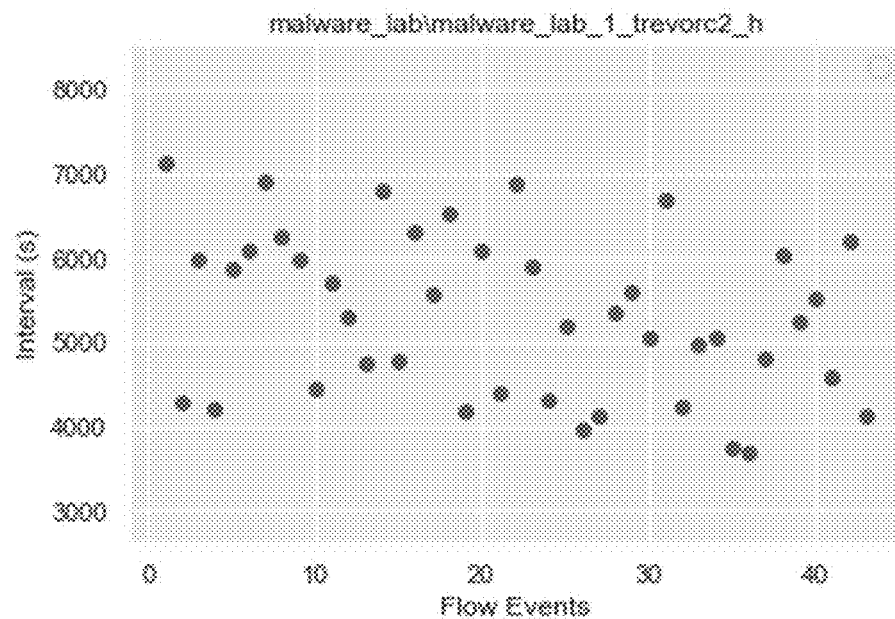
FIG. 4A is a graph showing communication intervals in malware network data used for training the machine learning engine according to the method of FIG. 2.

FIG. 4A is a graph showing communication intervals in malware network data used for training the machine learning engine.

Figure 4B:
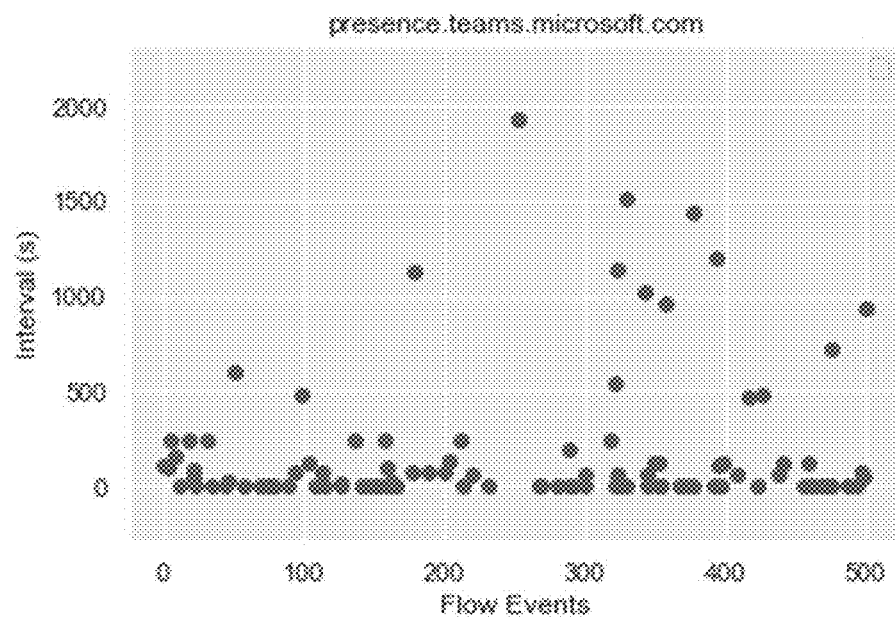
FIG. 4B is a graph showing communication intervals in benign network data used for training the machine learning engine according to the method of FIG. 2.

FIG. 4B is a graph showing communication intervals in benign network data used for training the machine learning engine.

Comparing FIG. 4A to 4B, it can be seen that the malware network data includes consistent and regular communication intervals and the benign network data includes communication intervals that include long periods of inactivity and has a large number of communication intervals close to zero.

In one or more embodiments, the malware network data may include a communication interval skew that is more consistent than the benign network data and/or may include a communication interval kurtosis that is more evenly clustered than the benign network data.

The method 200 includes engaging a feature extraction engine to generate a set of dyads for each source-destination pair in the training set of network data (step 220).

As mentioned, to generate the set of dyads for each source-destination pair in the network data, the feature extraction engine 140 may analyze the network data to categorize the network data by source-destination pair. For each source-destination pair, the set of dyads may include a number of flow events, a mean of bytes down, a standard deviation of bytes down, a mean of bytes up, a standard deviation of bytes up, a communication interval mean, a communication interval standard deviation, a communication interval skew, a communication interval kurtosis, a number of local end points that made a connection to the destination and a number of remote end points that the local endpoint connected to.

The method 200 includes training, using the set of dyads, a machine learning engine to differentiate between the benign network data and the malware network data (step 230).

The set of dyads are fed into the machine learning engine and are used to train the machine learning engine to classify network data as benign network data or malware network data. Once trained, the machine learning engine may classify network data as one of benign network data or malware network data.

In embodiments where the machine learning engine 150 includes a Random Forest classifier, the set of dyads may be labelled with a zero (0) indicating benign network data or may be labelled with a one (1) indicating malware network data. Further, a package function may be used to fit the model to the data. For example, a fitting method may be used for each decision tree associated with the Random Forest classifier and the fitting method may include selecting a feature and a numerical value such that when the network data is split based on the feature. In this manner, the purity of each split data chunk is maximized. This may be repeated multiple times for each decision tree and as such the classifier is trained for the prediction task.

Figure 5:
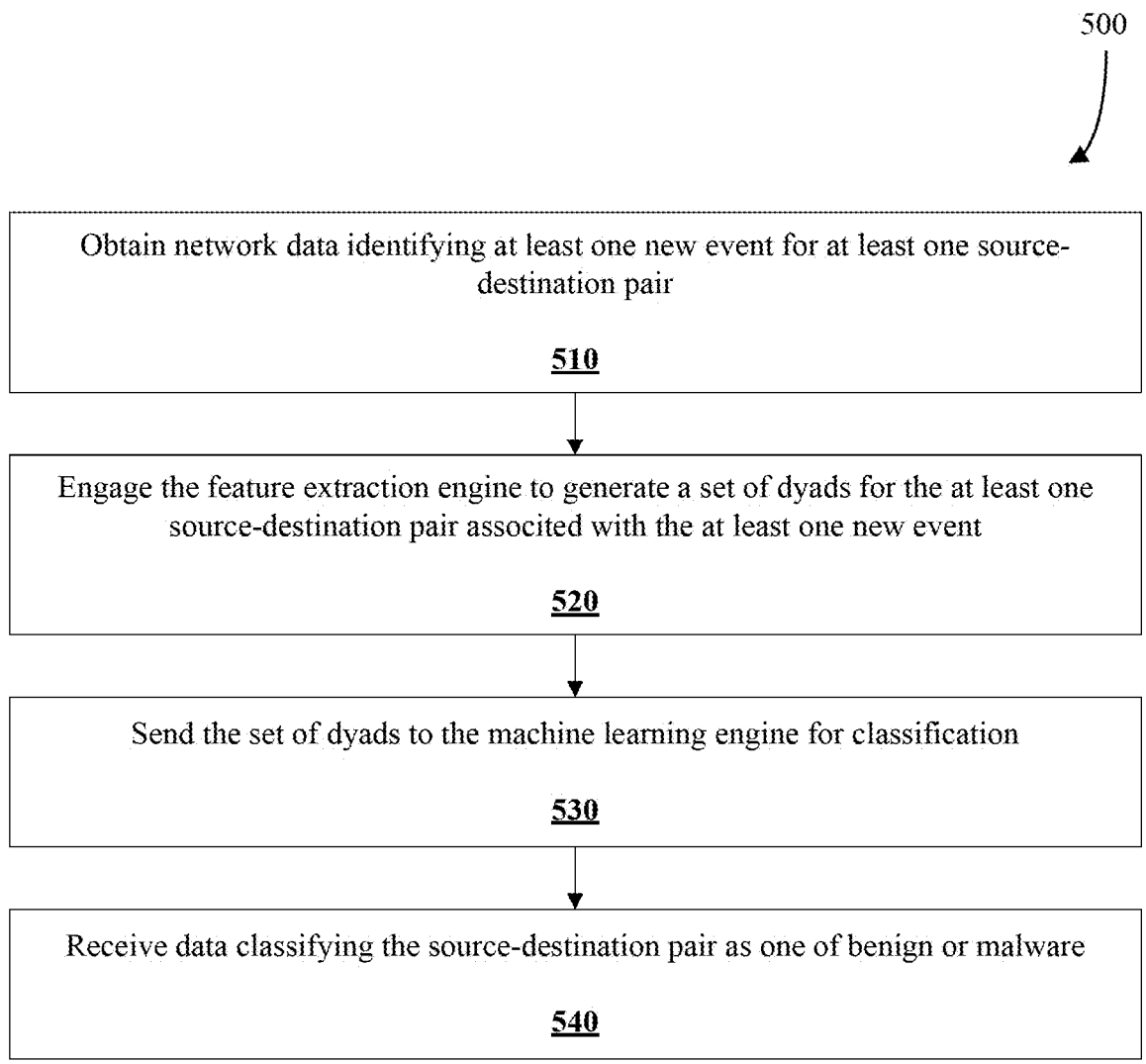
FIG. 5 provides a flow chart illustrating a method for machine learning based malware detection.

FIG. 5 is a flowchart showing operations performed for machine learning based malware detection according to an embodiment. The operations may be included in a method 500 which may be performed by the server computer system 110. For example, computer-executable instructions stored in memory of the server computer system 110 may, when executed by the processor of the server computer system, configure the server computer system 110 to perform the method 500 or a portion thereof.

The method 500 includes obtaining network data identifying at least one new event for at least one source-destination pair (step 510).

In one or more embodiments, the data store 120 may receive new flow events in the form of network data and this may be done periodically such as for example every minute, every five (5) minutes, every thirty (30) minutes, every hour, every twenty four (24) hours, etc. Specifically, the server computer system 110 may send a request for new flow events to one or more source or destination computer systems connected thereto and the new flow events may be received in the form of network data. The server computer system 110 may send the received network data to the data store 120 for storage.

The server computer system 110 may analyze the at least one new event to determine whether or not the at least one new event is associated with a source-destination pair that is known to be trusted. For example, the server computer system 110 may consult a whitelist stored in the data store 120 that includes a list of IP addresses that are known to be trusted to determine that the at least one new event is associated with a source-destination pair that is known to be trusted. Responsive to determining that the at least one new event is associated with a source-destination pair that is known to be trusted, the server computer system 110 may drop the at least one new event and take no further action.

Responsive to determining that the at least one new event is not associated with a source-destination pair that is known to be trusted, the server computer system 110 may send a request to the data store 120 for all network data available for the at least one source-destination pair. Put another way, the server computer system 110 does not only request network data associated with the at least one new event, but rather the server computer system 110 requests all available network data for the at least one source-destination pair associated with the at least one new event.

The method 500 includes engaging the feature extraction engine to generate a set of dyads for the at least one source-destination pair associated with the at least one new event (step 520).

The network data obtained by the server computer system 110 is sent to the feature extraction engine to generate a set of dyads for the at least one source-destination pair associated with the at least one new event. As mentioned, the set of dyads may include a number of flow events, a mean of bytes down, a standard deviation of bytes down, a mean of bytes up, a standard deviation of bytes up, a communication interval mean, a communication interval standard deviation, a communication interval skew, a communication interval kurtosis, a number of local end points that made a connection to the destination and a number of remote end points that the local endpoint connected to.

The method 500 includes sending the set of dyads to the machine learning engine for classification (step 530).

The set of dyads are sent to the machine learning engine for classification.

The method 500 includes receiving, from the machine learning engine, data classifying the source-destination pair as one of benign or malware (step 540).

As mentioned, the machine learning engine is trained to classify network data as one of benign network data or malware network data. Specifically, the machine learning engine analyzes the set of dyads to classify the network data as benign network data or malware network data.

The machine learning engine may classify the source-destination pair as one of benign or malware and this may be based on classifying the network data as benign network data or malware network data. For example, in embodiments where the network data is classified as malware network data, the at least one source-destination pair may be classified as malware.

In embodiments where the at least one source-destination pair is classified as benign, the server computer system 110 may determine that no further action is required.

In embodiments where the at least one source-destination pair is classified as malware, the server computer system 110 may perform one or more remedial actions. For example, the server computer system 110 may raise a flag or an alarm indicating that the source-destination pair is malware.

Figure 6:
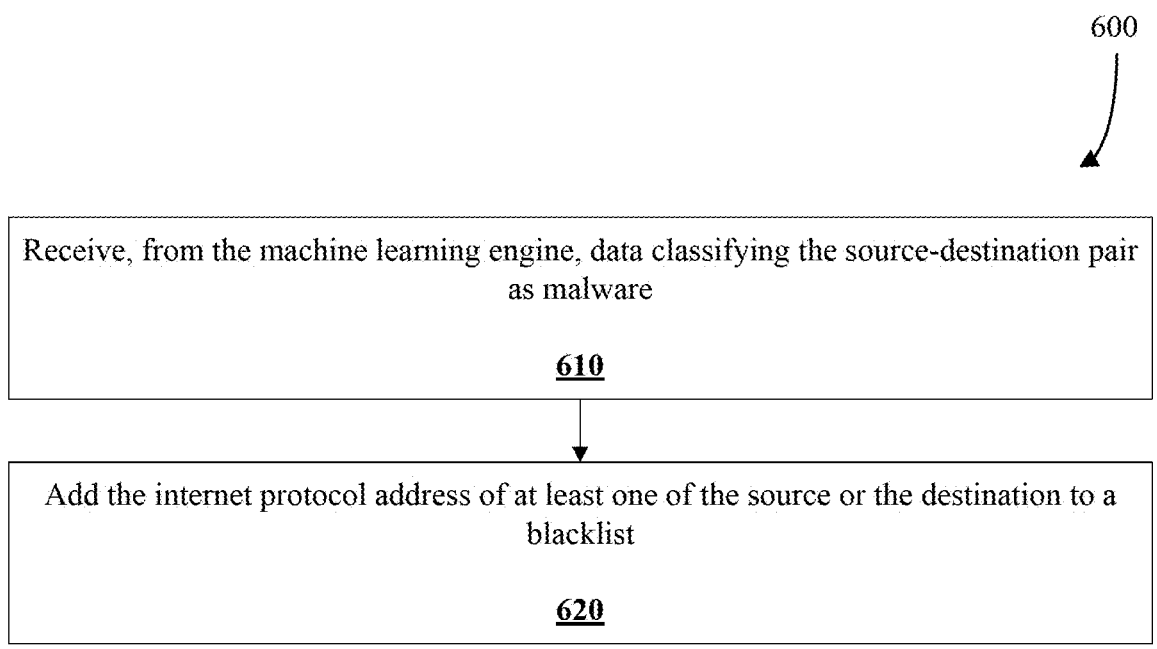
FIG. 6 provides a flow chart illustrating a method for adding an internet protocol address to a blacklist.

In another example, the server computer system 110 may add at least one of the source or destination of the source-destination pair to a blacklist. FIG. 6 is a flowchart showing operations performed for adding an internet protocol address to a blacklist according to an embodiment. The operations may be included in a method 600 which may be performed by the server computer system 110. For example, computer-executable instructions stored in memory of the server computer system 110 may, when executed by the processor of the server computer system, configure the server computer system 110 to perform the method 600 or a portion thereof.

The method 600 includes receiving, from the machine learning engine, data classifying the source-destination pair as malware (step 610).

The machine learning engine may perform operations similar to that described herein with reference to method 500 and may classify the source-destination pair as malware. In response, the server computer system 110 may receive, from the machine learning engine, data that classifies the source-destination pair as malware.

The method 600 includes adding the internet protocol address of at least one of the source or destination to a blacklist (step 620).

The server computer system 110 may determine an IP address of at least one of the source or destination by analyzing the network data associated therewith. The server computer system 110 may send a signal to the data store 120 to add the IP address to a blacklist maintained thereby.

It will be appreciated that in addition or in alternative to identifying the IP address of the destination as malware, in one or more embodiments a fully qualified domain name (FQDM) may be identified as malware.

Figure 7:
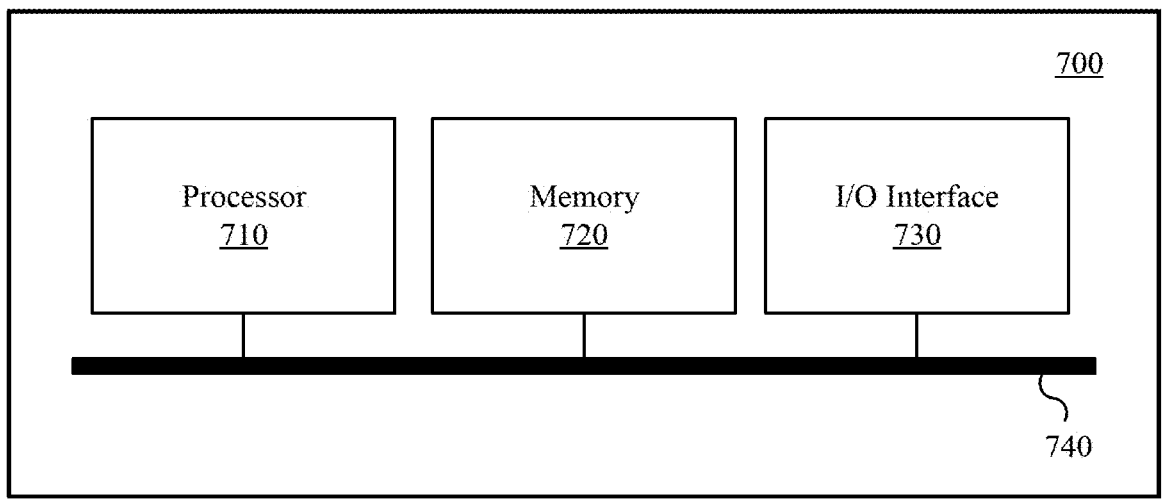
FIG. 7 shows a high-level block diagram of an example computing device according to an embodiment.

As mentioned, the server computer system 110 is a computing device. FIG. 7 shows a high-level block diagram of an example computing device 700. As illustrated, the example computing device 700 includes a processor 710, a memory 720, and an I/O interface 730. The foregoing modules of the example computing device 700 are in communication over and communicatively coupled to one another by a bus 740.

The processor 710 includes a hardware processor and may, for example, include one or more processors using ARM, x86, MIPS, or PowerPC™ instruction sets. For example, the processor 710 may include Intel™ Core™ processors, Qualcomm™ Snapdragon™ processors, or the like.

The memory 720 comprises a physical memory. The memory 720 may include random access memory, read-only memory, persistent storage such as, for example, flash memory, a solid-state drive or the like. Read-only memory and persistent storage are a computer-readable medium and, more particularly, may each be considered a non-transitory computer-readable storage medium. A computer-readable medium may be organized using a file system such as may be administered by software governing overall operation of the example computing device 700.

The I/O interface 730 is an input/output interface. The I/O interface 730 allows the example computing device 700 to receive input and provide output. For example, the I/O interface 730 may allow the example computing device 700 to receive input from or provide output to a user. In another example, the I/O interface 730 may allow the example computing device 700 to communicate with a computer network. The I/O interface 730 may serve to interconnect the example computing device 700 with one or more I/O devices such as, for example, a keyboard, a display screen, a pointing device like a mouse or a trackball, a fingerprint reader, a communications module, a hardware security module (HSM) (e.g., a trusted platform module (TPM)), or the like. Virtual counterparts of the I/O interface 730 and/or devices accessed via the I/O interface 730 may be provided such as, for example, by a host operating system.

Software comprising instructions is executed by the processor 710 from a computer-readable medium. For example, software corresponding to a host operating system may be loaded into random-access memory from persistent storage or flash memory of the memory 720. Additionally or alternatively, software may be executed by the processor 710 directly from read-only memory of the memory 720. In another example, software may be accessed via the I/O interface 730.

It will be appreciated that the malware engine 130, the feature extraction engine 140, and the machine learning engine 150 may also be computing devices similar to that described herein.

It will be appreciated that it may be that some or all of the above-described operations of the various above-described example methods may be performed in orders other than those illustrated and/or may be performed concurrently without varying the overall operation of those methods.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

What is claimed is:

1. A method comprising:
    obtaining a training set of network data that includes benign network data and malware network data generated to mimic malware beacons by varying a jitter amount;
    engaging a feature extraction engine to generate a set of dyads for each source-destination pair in the training set of network data;
    training, using the set of dyads, a machine learning engine to differentiate between the benign network data and the malware network data;
    obtaining network data identifying at least one new event for at least one source-destination pair;
    obtaining all network data available for the at least one source-destination pair;
    engaging the feature extraction engine to generate a set of dyads for the at least one source-destination pair associated with the at least one new event using the obtained network data; and
    sending the set of dyads for the at least one source-destination pair associated with the at least one new event to the machine learning engine for classification.

2. The method of claim 1, further comprising:
    receiving, from the machine learning engine, data classifying the at least one source-destination pair as one of benign or malware.

3. The method of claim 1, further comprising:
receiving, from the machine learning engine, data classifying the at least one source-destination pair as malware; and
adding an internet protocol address of at least one of the source or the destination to a blacklist.

4. The method of claim 1, further comprising:
generating, using a training malware server, the malware network data such that the malware network data includes an internet protocol address known to be associated with the training malware server.

5. The method of claim 1, wherein the malware network data is further generated to mimic the malware beacons by varying a communication interval or a data channel.

6. The method of claim 1, wherein the set of dyads for each source-destination pair includes communication interval skew and communication interval kurtosis.

7. The method of claim 1, wherein the malware network data includes a communication interval skew that is more consistent than the benign network data.

8. The method of claim 1, wherein the malware network data includes a communication interval kurtosis that is more evenly clustered than the benign network data.

9. The method of claim 1, wherein the set of dyads includes a number of flow events, a mean of bytes down, a standard deviation of bytes down, a mean of bytes up, a standard deviation of bytes up, a communication interval mean, a communication interval standard deviation, a communication interval skew, a communication interval kurtosis, a number of local end points that made a connection to the destination and a number of remote end points that a local endpoint connected to.

10. A system comprising:
at least one processor; and
a memory coupled to the at least one processor and storing instructions that, when executed by the at least one processor, configure the at least one processor to:
obtain a training set of network data that includes benign network data and malware network data generated to mimic malware beacons by varying a jitter amount;
engage a feature extraction engine to generate a set of dyads for each source-destination pair in the training set of network data;
train, using the set of dyads, a machine learning engine to differentiate between the benign network data and the malware network data;
obtain network data identifying at least one new event for at least one source-destination pair;
obtain all network data available for the at least one source-destination pair;
engage the feature extraction engine to generate a set of dyads for the at least one source-destination pair associated with the at least one new event using the obtained network data; and
send the set of dyads for the at least one source-destination pair associated with the at least one new event to the machine learning engine for classification.

11. The system of claim 10, wherein the instructions, when executed by the at least one processor, further configure the at least one processor to:
receive, from the machine learning engine, data classifying the at least one source-destination pair as one of benign or malware.

12. The system of claim 11, wherein the instructions, when executed by the at least one processor, further configure the at least one processor to:
receive, from the machine learning engine, data classifying the at least one source-destination pair as malware; and
add an internet protocol address of at least one of the source or the destination to a blacklist.

13. The system of claim 10, wherein the instructions, when executed by the at least one processor, further configure the at least one processor to:
generate, using a training malware server, the malware network data such that the malware network data includes an internet protocol address known to be associated with the training malware server.

14. The system of claim 10, wherein the malware network data is further generated to mimic the malware beacons by varying a communication interval or a data channel.

15. The system of claim 10, wherein the set of dyads for each source-destination pair includes communication interval skew and communication interval kurtosis.

16. The system of claim 10, wherein the malware network data includes at least one of a communication interval skew that is more consistent than the benign network data or a communication interval kurtosis that is more evenly clustered than the benign network data.

17. The system of claim 10, wherein the set of dyads includes a number of flow events, a mean of bytes down, a standard deviation of bytes down, a mean of bytes up, a standard deviation of bytes up, a communication interval mean, a communication interval standard deviation, a communication interval skew, a communication interval kurtosis, a number of local end points that made a connection to the destination and a number of remote end points that a local endpoint connected to.

18. A non-transitory computer readable medium having stored thereon processor-executable instructions that, when executed by the processor, cause the processor to:
obtain a training set of network data that includes benign network data and malware network data generated to mimic malware beacons by varying a jitter amount;
engage a feature extraction engine to generate a set of dyads for each source-destination pair in the training set of network data;
train, using the set of dyads, a machine learning engine to differentiate between the benign network data and the malware network data;
obtain network data identifying at least one new event for at least one source-destination pair;
obtain all network data available for the at least one source-destination pair;
engage the feature extraction engine to generate a set of dyads for the at least one source-destination pair associated with the at least one new event using the obtained network data; and
send the set of dyads for the at least one source-destination pair associated with the at least one new event to the machine learning engine for classification.

* * * * *